(12) United States Patent
Hosoya

(10) Patent No.: US 6,512,639 B2
(45) Date of Patent: Jan. 28, 2003

(54) LENS APPARATUS

(75) Inventor: Syuichi Hosoya, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/962,441

(22) Filed: Sep. 26, 2001

(65) Prior Publication Data
US 2002/0039239 A1 Apr. 4, 2002

(30) Foreign Application Priority Data
Sep. 29, 2000 (JP) ........................ 2000-300188

(51) Int. Cl.⁷ .............................. G02B 15/14
(52) U.S. Cl. ........................ 359/701; 359/702
(58) Field of Search ................ 359/701, 702, 359/703, 704

(56) References Cited

U.S. PATENT DOCUMENTS

| | | | | |
|---|---|---|---|---|
| 4,273,423 A | * | 6/1981 | Uesugi | 352/91 R |
| 5,936,781 A | * | 8/1999 | Kato | 359/699 |
| 6,046,865 A | * | 4/2000 | Ihara | 359/701 |

FOREIGN PATENT DOCUMENTS

| JP | 08-304739 A | 11/1996 |
|---|---|---|
| JP | 10-171045 A | 6/1998 |

* cited by examiner

Primary Examiner—Ricky Mack
(74) Attorney, Agent, or Firm—Birch, Stewart, Kolasch & Birch, LLP

(57) ABSTRACT

In a collapsing mechanism of the projecting lens apparatus, when a focus ring is moved to the back over a moving range for adjusting the focus, the focus ring is connected to a zoom ring. Then, the zoom ring rotates by following the focus ring which moves to the back, and a first and a second zoom lenses are moved to the back over a moving range for adjusting the zoom. Therefore, the focus ring completely collapses into a body of a projector.

2 Claims, 4 Drawing Sheets

LENS APPARATUS

BACKGROUND OF THE INVENTION

1. Field of the Invention

The present invention relates to a lens apparatus, particularly to one which is used as a projection lens apparatus for a liquid crystal projector.

2. Description of the Related Art

Japanese Patent Application Publication Nos. 8-304739 and 10-171045 disclose a liquid crystal projector in which a light source illuminates three liquid crystal panels for red (R) light, green (G) light and blue (B) light, respectively, on which an image is displayed, and the R, G and B light of the image that has passed through the three liquid crystal panels is combined through a cross dichroic prism, then the composed light of the image is projected on a screen through a projection lens apparatus.

The lens apparatus which is used as the projection lens apparatus comprises a zoom lens, a focus lens and a fixed cylinder supporting the lenses, and has a zoom ring and a focus ring. The zoom ring is rotatably arranged on the fixed cylinder, and the focus ring is arranged to be movable back and forth on the fixed cylinder. Rotating the zoom ring causes the zoom lens to move back and forth along the optical axis, whereby the zoom is adjusted. Moving the focus ring back and forth causes the focus lens to move back and forth along the optical axis, whereby the focus is adjusted.

In recent years, the liquid crystal projector has been miniaturized, and the projector can be carried with a lap-top computer. Many of the miniaturized liquid crystal projectors are not equipped with an electric mechanism for the focus and zoom adjustments, and the focus and zoom adjustments are performed by manual operations.

The majority of the lens apparatuses for the liquid crystal projector are of a type commonly called a front lens focusing. The miniaturized liquid crystal projector uses a collapsing type lens apparatus with a collapsing mechanism in order to be small-sized. The conventional collapsing mechanism is interlocked with the zoom mechanism, and collapsing is achieved by moving the zoom ring.

However, because the focus lens is arranged in front of the zoom lens in the lens apparatus, the zoom ring is arranged closer to the body of the liquid crystal projector than the focus ring; for that reason, when collapsing is performed by operating the zoom ring, the focus ring can not collapse completely and it still protrudes from the body of the liquid crystal projector.

SUMMARY OF THE INVENTION

The present invention has been developed in view of the above-described circumstances, and has as its object the provision of a lens apparatus which is capable of collapsing the focus ring completely.

In order to achieve the above-described object, the present invention is directed to a lens apparatus, comprising: a fixed cylinder of which axis is identical with an optical axis of the lens apparatus; a zoom lens arranged in the fixed cylinder movably along the optical axis; a focus lens arranged in the fixed cylinder movably along the optical axis; a zoom ring which is rotatably arranged on the fixed cylinder, the zoom ring being rotated to move the zoom lens along the optical axis to adjust zoom of the lens apparatus; a focus ring which is arranged on the fixed cylinder movably along the optical axis, the focus ring being moved to move the focus lens along the optical axis to adjust focus of the lens apparatus; and a collapsing mechanism which, when the focus ring is moved back over a range of movement for adjusting the focus, connects the focus ring to the zoom ring and rotates the zoom ring along with the back movement of the focus ring so as to move the zoom lens back over a range of movement for adjusting the zoom.

The lens apparatus of the present invention is provided with the collapsing mechanism which achieves collapsing by moving the focus ring; thus, the focus ring is collapsed in the body of an apparatus such as a liquid crystal projector when the focus ring is moved which is positioned at the front of the zoom ring along the optical axis. According to the collapsing mechanism, the focus ring is connected to the zoom ring when the focus ring is moved back over the range of movement for adjusting the focus, and the zoom ring is rotated when the focus ring is moved to the back, whereby the zoom lens is moved back over the range for adjusting the zoom. Since a movable range of the focus lens at a time of collapsing can be obtained by moving the zoom lens to the back, a movable range of the focus ring at a time of collapsing can be deep. Therefore, the focus ring can be collapsed completely in the body of the apparatus.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereunder a preferred embodiment for a lens apparatus of the present invention will be described in detail in accordance with the accompanying drawings.

Figure 1:
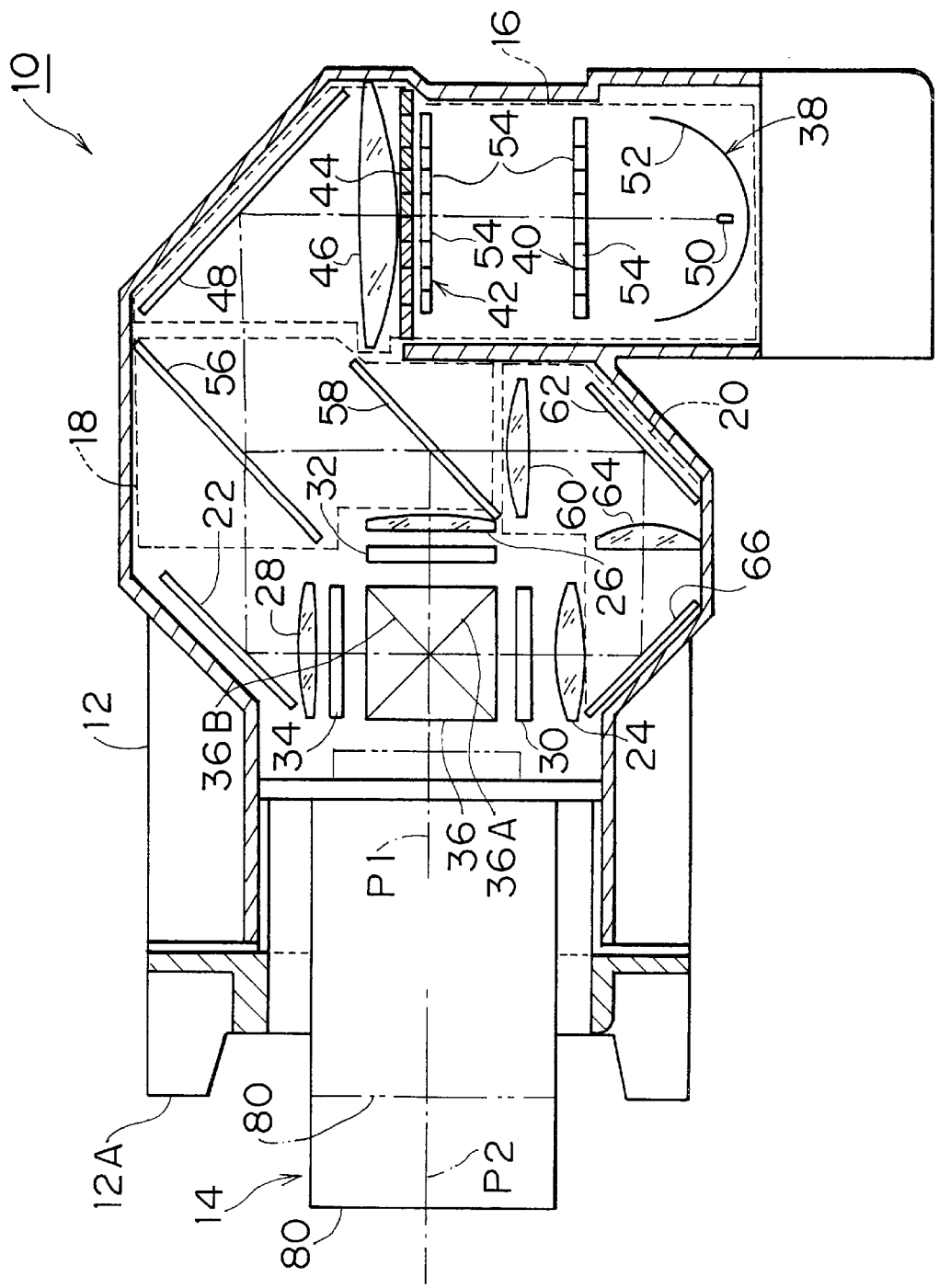
FIG. 1 is a view showing a structure of a liquid crystal projector to which a lens apparatus according to an embodiment of the present invention is applied.

A liquid crystal projector 10 in FIG. 1 is constructed of a projector body 12 and a projection lens apparatus (lens apparatus) 14.

The projector body 12 has an illumination assembly 16, a color separation assembly 18, a light conduct assembly 20, a reflective mirror 22, three field lenses 24, 26 and 28, three liquid crystal panels (transparent liquid crystal plates) 30, 32 and 34 for red (R), green (G) and blue (B) lights, respectively, and a cross dichroic prism 36, all of which are arranged at predetermined positions.

The illumination assembly 16 comprises a light source 38, two lens arrays 40 and 42, a polarization converting device 44, a condenser lens 46, and a reflective mirror 48. The light source 38 comprises a mercury-vapor lamp 50 and a reflector 52, which is formed like a concave mirror for projecting light emitted from the mercury-vapor lamp 50 as a bundle of lights that are substantially parallel to each other.

The lens arrays 40 and 42 are constituted in which the number of rectangular small lenses 54 are arranged in series like a matrix so as to form a rectangular plate as a whole. The small lenses 54 of the lens array 50 divide the bundle of lights projected from the light source 38 into partial light bundles corresponding with the number of the small lenses 54, and can collect the light near the lens array 40.

The polarization converting device 44 converts an incident light into a predetermined linear polarized light composition, and is constructed of a polarized light beam splitter array and a selected phase-contrast plate (both not shown). The polarized light beam splitter array splits the partial light bundles divided by the lens arrays 40 and 42 into the two types of linear polarized light (the p polarized light and the s polarized light). The selected phase-contrast plate converts the p polarized light, which is split from the light bundles by the polarized light beam splitter array, into the s polarized light. Consequently, the light bundles that have had random polarization directions and have entered into the polarization converting device 44 are all projected as the s polarized light.

The partial light bundles of the s polarized light projected from the polarization converting device 44 are collected by the condenser lens 46, and are fully reflected by the reflective mirror 48, then are projected to the color separation assembly 18. The illumination assembly 16, which is constructed as described above, illuminates the three R, G and B liquid crystal panels 30, 32 and 34 in almost uniform brightness.

The color separation assembly 18 has two dichroic mirrors 56 and 58, which separate a white light having been reflected on the reflective mirror 48 into the three R, G and B lights. The B light composition of the white light goes through the dichroic mirror 56, and the G light composition and the R light composition are reflected on the dichroic mirror 56. The B light having passed through the dichroic mirror 56 is reflected on the reflective mirror 22 and goes through the field lens 28, whereby it becomes a bundle of lights that are substantially parallel to each other and illuminate the B liquid crystal panel 34 for the blue light.

The G light having been reflected on the dichroic mirror 56 is reflected on the dichroic mirror 58 and goes through the field lens 26, whereby it becomes a bundle of lights that are substantially parallel to each other and illuminate the G liquid crystal panel 32 for the green light. The R light having been reflected on the dichroic mirror 56 goes through the dichroic mirror 58 and enters into the field lens 24 after going through a relay lens 60, a reflective mirror 62, a relay lens 64 and a reflective mirror 66, which constitute the light conduct assembly 20. The R light goes through the field lens 24, whereby it becomes a bundle of lights that are parallel to each other and illuminate the R liquid crystal panel 30 for the red light. Polarization plates (not shown) are attached to light projecting planes of the field lenses 24, 26 and 28, and the polarization plates adjust an angle of the lights projected from the field lenses 24, 26 and 28 at an entering angle for the projected lights to enter the liquid crystal panels 30, 32 and 34.

Each of the three liquid crystal panels 30, 32 and 34 displays an image for each color according to an image signal outputted from a liquid crystal driving part (not shown). Each image is illuminated by each of the projected lights from the field lenses 24, 26 and 28, and each of the passed image lights enters into the cross dichroic prism 36. A dielectric multi-layered film 36A that reflects the red light and another dielectric multi-layered film 36B that reflects the blue light are crossed in the cross dichroic prism 36, in which the image lights are combined. The composed image light is projected from the cross dichroic prism 36 toward the projection lens apparatus 14, and is projected on a screen (not shown) by the projection lens apparatus 14; thereby a color image is displayed on the screen.

Figure 2:
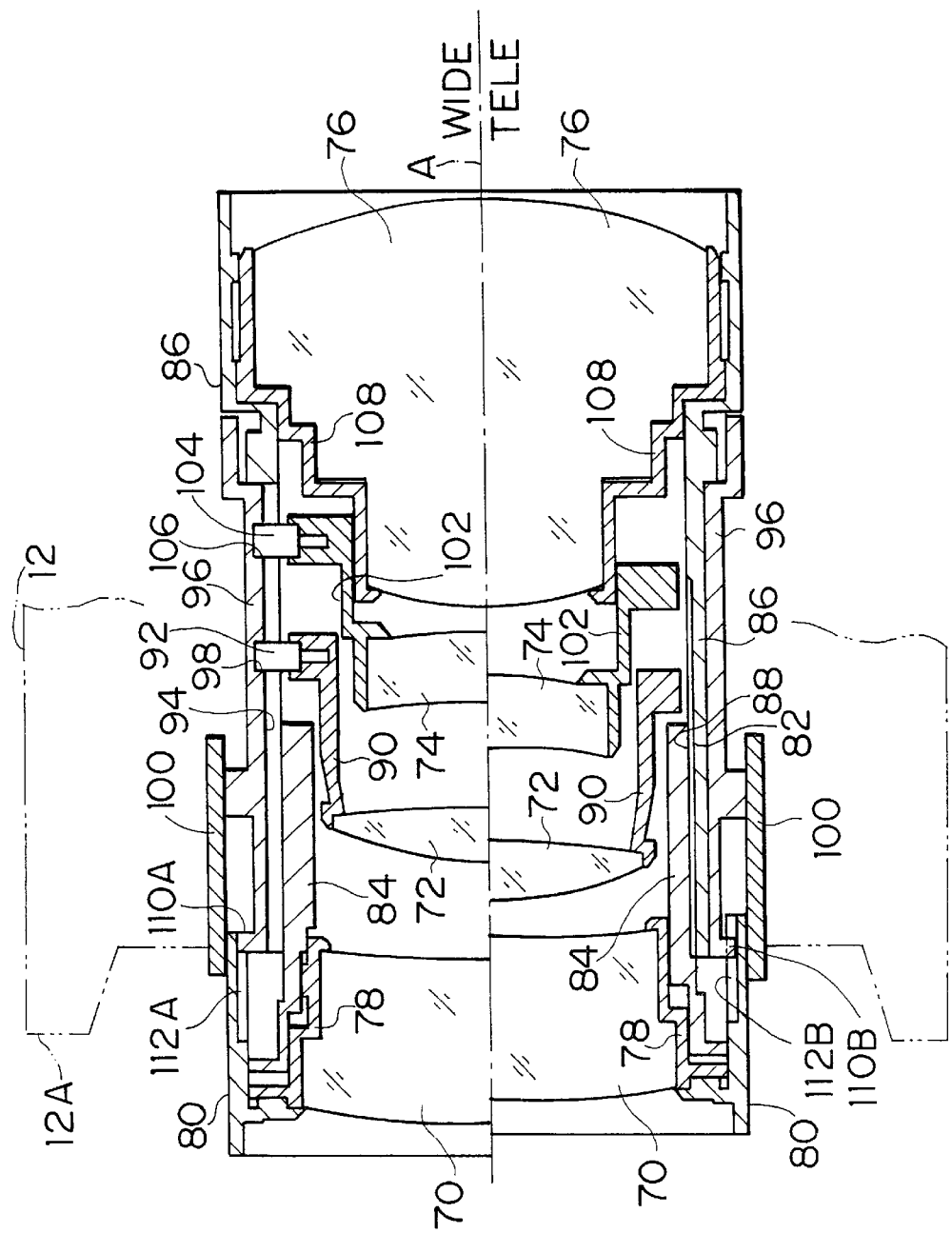
FIG. 2 is a section view of the lens apparatus in FIG. 1.

FIG. 2 is a section view of the projection lens apparatus 14. The upper part of the section view with respect to the center line A in FIG. 2 shows the section of the projection lens apparatus 14 that is set at a wide angle side, and the lower part of the section view with respect to the center line A shows the section of the projection lens apparatus 14 that is set at a telephoto side.

The projection lens apparatus 14 has four lens groups, which are a focus lens 70, a first zoom lens 72, a second zoom lens 74 and a fixed lens 76, in the order when viewed from the front to the back of the optical axis of the projected image (i.e. from the left to right in FIG. 2).

The focus lens 70 is held by a holding frame 78, which is fixed to a focus ring 80. A threaded cylinder 84 is fixed to the holding frame 78, and a helicoid thread 82 is formed on an outer periphery of the threaded cylinder 84. The helicoid thread 82 is engaged with a helicoid thread 88 that is formed at the front of an inner periphery of a fixed cylinder 86. Since the thread cylinder 84 rotates by following the rotation of the focus ring 80 when the focus ring 80 is manually rotated, the focus lens 70 moves back and forth along the optical axis by being fed with the helicoid threads 82 and 88, and the focus is thereby adjusted.

The first zoom lens 72 is held by a holding frame 90, on which cam pins 92 protrude. There are actually three cam pins 92, which are provided on an outer periphery of the holding frame 90 in equal intervals. The cam pins 92 are inserted through straight grooves 94, which are formed at the fixed cylinder 86 in parallel with the optical axis, and are coupled with cam grooves 98 formed on a cam cylinder 96, which is rotatably arranged on the outer periphery of the fixed cylinder 86. A zoom ring 100 is fixed on the outer periphery of the cam cylinder 96.

The second zoom lens 74 is held by a holding frame 102 in the same manner as the first zoom lens 72, and cam pins 104 are provided on the holding frame 102. There are actually three cam pins 104, which are provided on an outer periphery of the holding frame 102 in equal intervals. The cam pins 104 are inserted through the straight grooves 94 of the fixed cylinder 86, and are coupled with cam grooves 106 formed on the cam cylinder 96.

Since the cam cylinder 96 rotates when the zoom ring 100 is manually rotated, straight guiding by the cam pins 92 and 104 and the straight grooves 94 and feeding by the cam pins 92 and 104 and the cam grooves 98 and 106 cause the first zoom lens 72 to move back and forth along the optical axis on a track that is specified by the cam grooves 98 and at the same time cause the second zoom lens 74 to move back and forth along the optical axis on a track that is specified by the cam grooves 106; thereby, the zoom is adjusted.

The fixed lens 76 is held by a holding frame 108, which is fixed to the rear part of the fixed cylinder 86.

In the projection lens apparatus 14 with the structure described above, a projecting magnification of the image on the screen can be changed when rotating the zoom ring 100, and if the image is out of focus at that time, it can be adjusted by rotating the focus ring 80. The focus ring 80 of the projection lens apparatus 14 in telephoto and wide sides shown in FIG. 2 is always maintained at a state where it protrudes from a front face 12A of the projector body 12, and has not collapsed in the back from the front face 12A.

Figure 3:
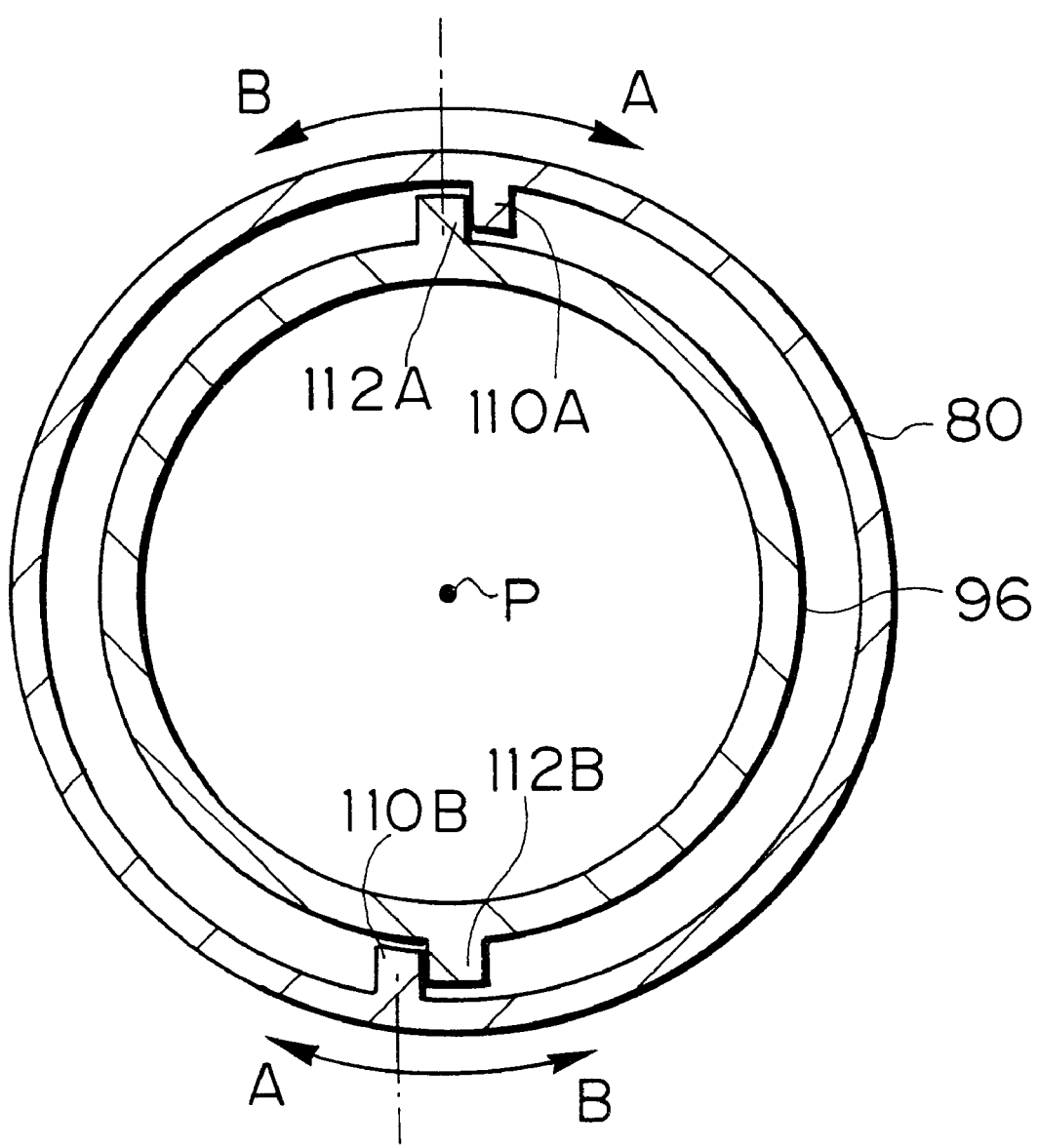
FIG. 3 is a section view showing an interlocking mechanism between a focus ring and a cam cylinder in the lens apparatus in FIG. 1.

Projecting pieces 110A and 110B are formed on an inner peripheral face of the focus ring 80 in the manner seen from FIG. 3, and they are formed at positions symmetrical to each other with the optical axis P as the center. Stopper pieces 112A and 112B are formed on the outer peripheral face of the cam cylinder 96 for contacting with the projecting pieces 110A and 110B. The stopper pieces 112A and 112B are also formed at positions symmetrical to each other with the optical axis P as the center so that they come in contact with the projecting pieces 110A and 110B at the same time.

The rotation range of the focus ring 80 for adjusting focus is set at 180 degrees between the state shown in FIG. 3 and a state where the upper projecting piece 110A contacts with the lower stopper piece 112B while the lower projecting piece 110B contacts with the upper stopper piece 112A in the entire rotating range of the focus ring 80 in the clockwise direction (the direction of the arrow A) in FIG. 3.

Figure 4:
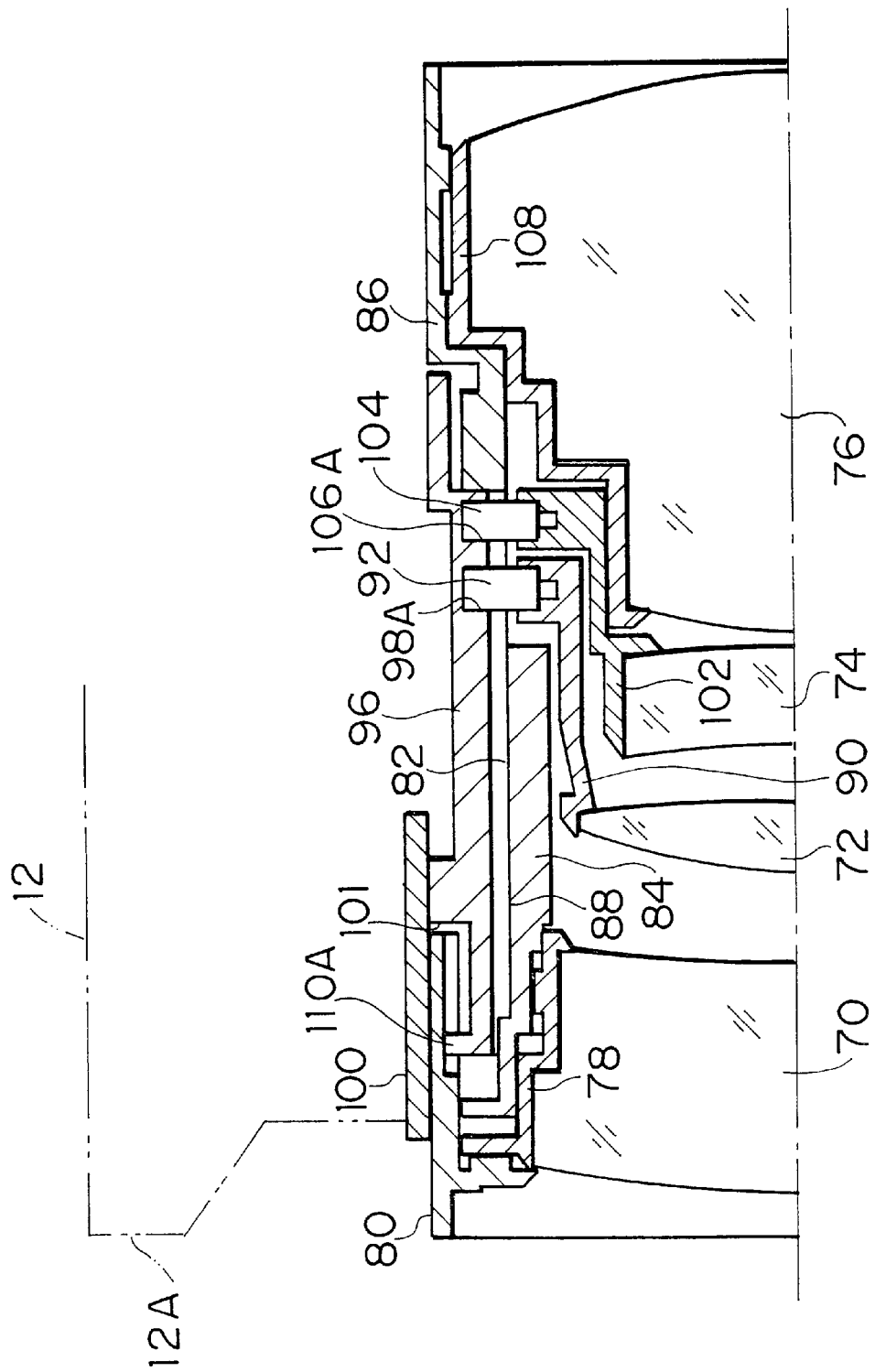
FIG. 4 is a section view showing a state where the lens apparatus is collapsed in a body of the liquid crystal projector.

When the focus ring 80 is further rotated in the direction of the arrow A in the state where the upper projecting piece 110A contacts with the lower stopper 110B, that is, when the focus ring 80 is rotated over the range of rotation for adjusting focus, the feeding of the helicoid threads 82 and 86 causes the focus ring 80 to enter into a space 101 between the zoom ring 100 and the cam cylinder 96 in the manner seen from FIG. 4. If the focus ring 80 is further rotated in the above-mentioned direction, the focus ring 80 becomes contained in the space 101 almost entirely. Thereby, the focus ring 80 moves to the back from the front face 12A of the projector body 12, and the focus ring 80 becomes collapsed in the projector body 12.

The cam cylinder 96 at that state is driven by the projecting pieces 110A and 110B of the focus ring 80, that is, the cam cylinder 96 rotates in the same direction as the focus ring 80 by following the movement of the focus ring 80. The cam cylinder 96 has cam grooves 98A and 106A for collapsing the moving lens. The cam grooves 98A and 106A are continuously formed following the cam grooves 98 and 106, respectively, which control the zoom range. When the focus ring 80 moves to the back, the first zoom lens 72 further moves to the back along the cam groove 98A over the zoom moving range, and the second zoom lens 74 further moves to the back along the cam groove 106A over the zoom moving range. The focus lens 70 that has moved to the back by the rotation of the focus ring 80 is thus prevented from colliding with the first zoom lens 72. Since the focus ring 80 thus obtain a sufficient movable range (collapsing amount) to the back, the focus ring 80 can be completely collapsed into the projector body 12.

According to the projection lens apparatus 14 of the present embodiment, the collapsing mechanism is used for achieving the focus ring 80 to collapse. Therefore, when the focus ring 80 is moved, which is positioned at the front of the zoom ring 100 along the optical axis, the focus ring 80 can be completely collapsed into the projector body 12.

Further, according to the collapsing mechanism of the projection lens apparatus 14, when the focus ring 80 moves to the back over the moving range for adjusting focus, the focus ring 80 is connected to the zoom ring 100, and the zoom ring 100 rotates by following the back movement of the focus ring 80, then the first and second zoom lenses 72 and 74 move to the back over the range for adjusting zoom. Since the movable range of the focus lens 70 at the time of collapsing can be obtained when the first and the second lenses 72 and 74 are moved back in the manner described above, the deep movable range of the focus ring 80 at the time of collapsing can be obtained. Therefore, the focus ring 80 can be completely collapsed into the projector body 12 in the manner shown in FIG. 4.

In the present embodiment, an example is presented in which the lens apparatus according to the present invention is used as a projection lens apparatus for the liquid crystal projector; however, the lens apparatus according to the present invention may also be used as a taking lens apparatus of a camera.

As described hereinabove, according to the lens apparatus of the present invention, the collapsing mechanism is provided which achieves collapsing by moving the focus ring. The focus ring can be completely collapsed into the body of the apparatus by moving the focus ring arranged at the front of the zoom ring along the optical axis.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens apparatus, comprising:
   a fixed cylinder of which axis is identical with an optical axis of the lens apparatus;
   a zoom lens arranged in the fixed cylinder movably along the optical axis;
   a focus lens arranged in the fixed cylinder movably along the optical axis;
   a zoom ring which is rotatably arranged on the fixed cylinder, the zoom ring being rotated to move the zoom lens along the optical axis to adjust zoom of the lens apparatus;
   a focus ring which is arranged on the fixed cylinder movably along the optical axis, the focus ring being moved to move the focus lens along the optical axis to adjust focus of the lens apparatus; and
   a collapsing mechanism which, when the focus ring is moved back over a range of movement for adjusting the focus, connects the focus ring to the zoom ring and rotates the zoom ring along with the back movement of the focus ring so as to move the zoom lens back over a range of movement for adjusting the zoom.

2. The lens apparatus as defined in claim 1, wherein the focus ring is arranged at a front of the zoom ring along the optical axis.

* * * * *